Patented May 24, 1932

1,860,287

UNITED STATES PATENT OFFICE

ERNST PAUL HÄUSSLER, OF RIEHEN, NEAR BASEL, SWITZERLAND, ASSIGNOR TO HOFFMANN-LA ROCHE INC., OF NUTLEY, NEW JERSEY, A CORPORATION OF NEW JERSEY

SEXUAL HORMONES AND PROCESS FOR THE MANUFACTURE OF SAME

No Drawing. Application filed May 9, 1928, Serial No. 276,505, and in Germany May 16, 1927.

Substances of hormone-like action on the female genital tract have so far in larger quantities sufficient for technical production only been found in the ovaries and placenta.

In the last years such substances, for which S. Loewe (Deutsche medizinische Wochenschrift, 1926, page 185) has introduced the name thelykinines, have been found in smaller quantities in other tissues and secretions. The presence of these hormones was proved only with the Allen Doisy test, that is by bringing on the clod state in the vaginal mucous membrane (Dohrn, Klinische Wochenschrift, 1927, page 359). According to Hartmann (Klinische Wochenschrift, 1926, page 2152) such substances should, however, first of all possess the power of bringing on a strong hypertrophy of the uterus.

It has now been found, that from bile, products may be obtained which with regard to the bringing on of the clod state and also to the growth and thickening of the uterus are equal to the actual ovary and placenta hormones and which are to be found in the bile in such quantities as to render their technical production profitable. The preparations thus obtained are insoluble in water or light petroleum, but soluble in alcohol, in dilute alkalis and also in solutions of bile salts. From such solutions they are precipitated by dilute acids and can then be extracted with ether or benzol. They contain but small quantities of nitrogen.

The following examples illustrate the preparation of the sexual hormone, which are to be used in therapy.

Example 1

1 liter of fresh bile is, with the addition of animal charcoal, evaporated, the residue dissolved in a little absolute alcohol and to the hot solution is added double the quantity of acetone. The solution is poured off the precipitate thus obtained, again evaporated and the residue extracted with ether or chloroform. After the solvent has been evaporated, the sexual hormone is obtained in a yield of 2-4 grams.

Example 2

100 grams of bile salts are extracted with dry ether during 12 to 24 hours in the Soxhlet apparatus. When the solvent has been evaporated, the ether extract yields 1-2 grams of a yellowish strongly active residue.

Example 3

Instead of fresh bile inspissated bile may be used, for instance Fel tauri inspissatum. This is a thickened bile and is the same as Extractum Fellis Bovis, U. S. Pharmacopœia, tenth edition, 1926, page 151.

Example 4

10 liters of fresh bile are four times shaken with 3 liters of ether. The ether extracts are united, concentrated, several times washed with water and dried with dehydrated Glauber's salt. The ether is then completely evaporated and one obtains 8-15 grams or a semi-solid brown product. By treating this residue with 0.5 liters of petroleum ether about 1 gram of a brown product, insoluble in petroleum ether, is obtained, which is soluble in ether, in dilute soda-solution and in solutions of bile salts.

I claim:

1. The process for the extraction of a sexual hormone which includes the step of extracting bile with a solvent of the group comprising ether, chloroform, and benzol.

2. A process for the extraction of a sexual hormone which consists in preparing a solution of bile salts, precipitating the sexual hormone from the bile salt solution with dilute acids, extracting the percipitate with a solvent selected from the group comprising ether, benzol, chloroform, and then evaporating the solvent from the extracted hormone.

3. As a new material, a sexual hormone obtained by extracting bile with a solvent selected from the group benzol, ether, and chloroform, said hormone being insoluble in water and light petroleum but soluble in alcohol, dilute alkalis and in bile salt solutions, from the latter of which it may be precipitated by dilute acids.

4. A process for extracting a sexual hormone which includes the step of extracting products containing said hormone prepared from bile with a solvent selected from the group comprising benzol, ether, and chloroform.

ERNST PAUL HÄUSSLER.